United States Patent
Kuo

(10) Patent No.: US 9,619,077 B2
(45) Date of Patent: Apr. 11, 2017

(54) TOUCH DISPLAY APPARATUS AND OPERATION METHOD OF TOUCH DEVICE THEREOF

(71) Applicant: Acer Incorporated, New Taipei (TW)

(72) Inventor: Jin-Ting Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 103 days.

(21) Appl. No.: 14/599,542

(22) Filed: Jan. 19, 2015

(65) Prior Publication Data

US 2016/0117030 A1  Apr. 28, 2016

(30) Foreign Application Priority Data

Oct. 28, 2014  (TW) .............................. 103137206 A

(51) Int. Cl.
*G06F 3/041* (2006.01)

(52) U.S. Cl.
CPC ................... *G06F 3/0416* (2013.01)

(58) Field of Classification Search
CPC ..................................................... G06F 3/0412
USPC .................................................. 345/170–174
See application file for complete search history.

(56) References Cited

U.S. PATENT DOCUMENTS

| 2014/0160043 | A1* | 6/2014 | Hwang | ................ | G06F 3/0418 345/173 |
| 2015/0049045 | A1* | 2/2015 | Yousefpor | ............... | G06F 3/044 345/174 |
| 2015/0091864 | A1* | 4/2015 | Reynolds | ................ | G06F 3/044 345/174 |
| 2015/0268759 | A1* | 9/2015 | Ludden | ................... | G06F 3/044 345/174 |

\* cited by examiner

*Primary Examiner* — Tony Davis
(74) *Attorney, Agent, or Firm* — Jianq Chyun IP Office

(57) ABSTRACT

A touch display apparatus and an operation method of a touch apparatus thereof are provided. The operation method of the touch apparatus includes the following steps, namely, providing a touch capability regulating signal according to a plurality of image data in a column of an image frame; providing a touch driving signal to a first touch electrode in sequence according to a first clock signal and a second clock signal; changing at least one of an amplitude and a frequency of the first clock signal and the second clock signal according to the touch capability regulating signal.

12 Claims, 3 Drawing Sheets

TOUCH DISPLAY APPARATUS AND OPERATION METHOD OF TOUCH DEVICE THEREOF

CROSS-REFERENCE TO RELATED APPLICATION

This application claims the priority benefit of Taiwan application serial no. 103137206, filed on Oct. 28, 2014. The entirety of the above-mentioned patent application is hereby incorporated by reference herein and made a part of this specification.

BACKGROUND OF THE INVENTION

Field of the Invention

The invention is related to a touch apparatus and an operation method thereof, and more particularly to a touch display apparatus and an operation method of a touch apparatus thereof.

Description of Related Art

For the past few years, significant advancements and applications have been achieved in the fields of information technology, wireless mobile communication and information appliance. To make it easier for information products to be used and also to make them to be more compact and human, more and more of them are equipped with a touch panel as an input device which replaces conventional input devices such as a keyboard or a mouse, wherein the touch panel may be operated through touch of fingers. However, a touch panel is either embedded or attached to a display panel, and a change in pixel voltage of the display panel may influence the touch panel to sense the touch point; therefore, it remains to be an issue to design a driving circuit for the touch panel that can accurately sense the touch point of fingers without being interfered by the change in the pixel voltage.

SUMMARY OF THE INVENTION

The invention provides a touch display apparatus and an operation method of a touch apparatus thereof which may prevent the touch apparatus from making a wrong detection of the touch point.

In the invention, the touch display apparatus includes a display apparatus and a touch apparatus. The display apparatus includes a pixel array and a display driving circuit. The pixel array forms a display area. The display driving circuit receives an image signal and is coupled to the pixel array to drive the pixel array according to the image signal, and provides a touch capability regulating signal according to a plurality of image data in a column of an image frame. The touch apparatus includes a plurality of first touch electrodes, a plurality of second touch electrodes, a touch driving circuit and a touch detecting circuit. The first touch electrodes and the second touch electrodes interlace with one another to form a touch area, wherein the touch area overlaps the display area. The touch driving circuit is coupled to the first touch electrodes to provide a touch driving signal to the first touch electrode in sequence according to a first clock signal and a second clock signal. The touch detecting circuit is coupled to the second touch electrodes to receive a touch detecting signal, coupled to the touch driving circuit to provide the first clock signal and the second clock signal, and coupled to the display driving circuit to change at least one of an amplitude and a frequency of the first clock signal and the second clock signal according to the touch capability regulating signal.

In an embodiment of the invention, when the occurrence of a voltage edge in a plurality of pixel voltages corresponding to the column of image data is greater than an interference threshold, the touch detecting circuit increases at least one of the amplitude and frequency of the first clock signal and the second clock signal. When the occurrence of the voltage edge in the pixel voltages is less than the interference threshold, the touch detecting circuit recovers the amplitude and frequency of the first clock signal and the second clock signal.

In an embodiment of the invention, the first touch electrodes and the second touch electrodes perpendicularly interlace with one another.

In an embodiment of the invention, the touch driving circuit provides the touch driving signal to the first touch electrode in sequence during a touch detecting period, and the touch detecting period overlaps a frame scanning period of the pixel array.

In an embodiment of the invention, the first clock signal and the second clock signal are inversion signals of each other.

In an embodiment of the invention, the display apparatus further includes an active array substrate and a color filter substrate. The color filter substrate and the active array substrate are assembled together. The pixel array, display driving circuit and the touch driving circuit are configured at the active array substrate; the first touch electrodes and the second touch electrodes are configured at the color filter substrate.

In an embodiment of the invention, the display driving circuit includes a gate driver, a source driver and a timing controller. The gate driver is coupled to the pixel array to drive a plurality of pixels of the pixel array row by row. The source driver is coupled to the pixel array to provide a plurality of pixel voltages to the pixels in sequence according to the image data. The timing controller is coupled to the gate driver, source driver and the touch detecting circuit for receiving an image signal to provide the image data, wherein the timing controller controls the gate driver according to the image signal. The timing controller provides the image data to the source driver according to the image signal, and provides the touch capability regulating signal according to the image data.

In an embodiment of the invention, the gate driver and the touch driving circuit respectively include a plurality of shifter registers.

In the invention, an operation method of a touch apparatus includes the following steps, namely, providing a touch capability regulating signal according to a plurality of image data in a column of an image frame; providing a touch driving signal to a first touch electrode in sequence according to a first clock signal and a second clock signal; changing at least one of an amplitude and a frequency of the first clock signal and the second clock signal according to the touch capability regulating signal.

In an embodiment of the invention, the step of changing at least one of the amplitude and frequency of the first clock signal and the second clock signal according to the touch capability regulating signal includes the following steps, namely, when the occurrence of a voltage edge in a plurality of pixel voltages corresponding to the column of the image data is greater than an interference threshold, increasing at least one of the amplitude and frequency of the first clock signal and the second clock signal; when the occurrence of the voltage edge in the pixel voltages is less than the interference threshold, recovering the amplitude and frequency of the first clock signal and the second clock signal.

In an embodiment of the invention, the voltage edge is a voltage difference which is between each pixel voltage and an adjacent pixel voltage and greater than or equal to a voltage oscillation threshold.

Based on the above, in the embodiments of the invention, the touch display apparatus and an operation method of a touch apparatus thereof determine whether the image frame transmitted by the image signal causes oscillation of the pixel voltage, thereby adjusting the touch sensing capability of the touch apparatus so as to prevent the touch apparatus from making a wrong detection of the touch point.

In order to make the aforementioned features and advantages of the invention more comprehensible, embodiments accompanying figures are described in detail below.

DESCRIPTION OF EMBODIMENTS

Figure 1A:
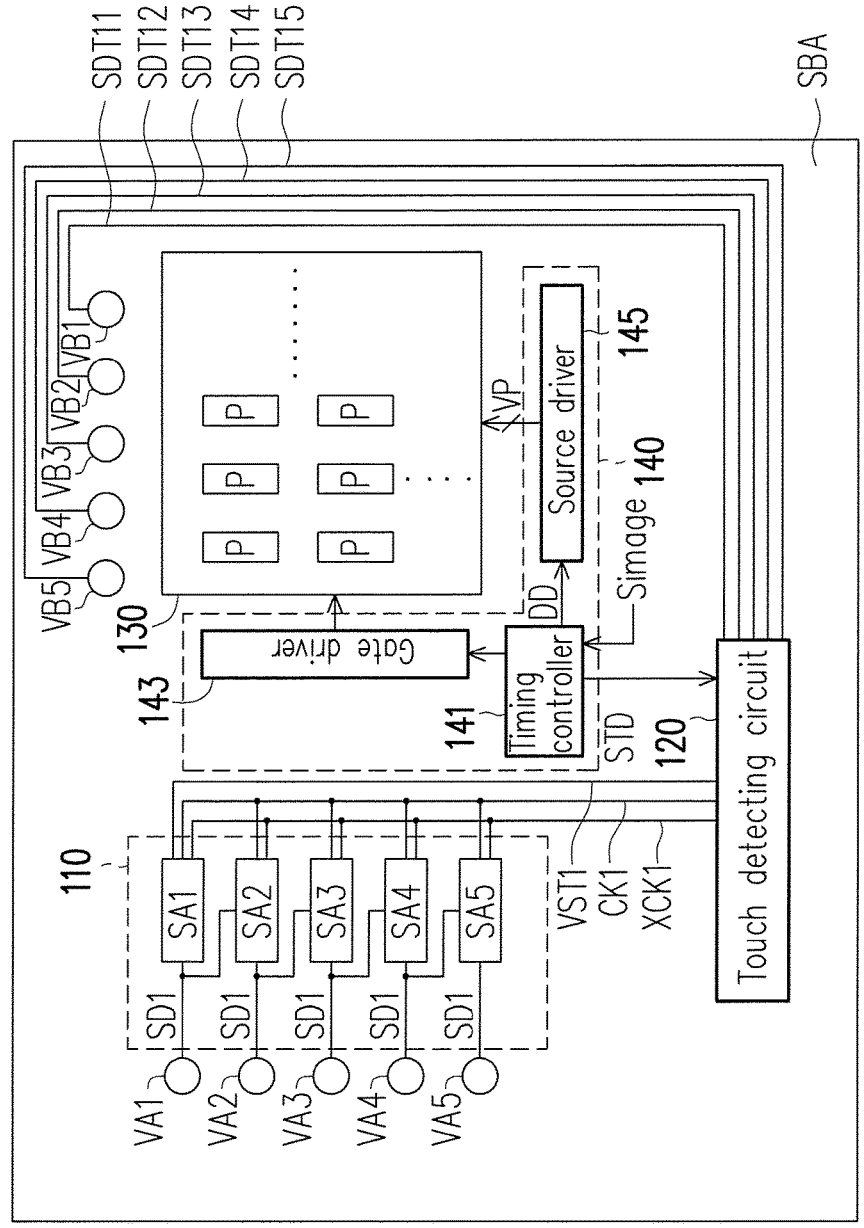
FIGS. 1A and 1B are schematic views illustrating a structure of a touch display apparatus according to an embodiment of the invention.
Figure 1B:
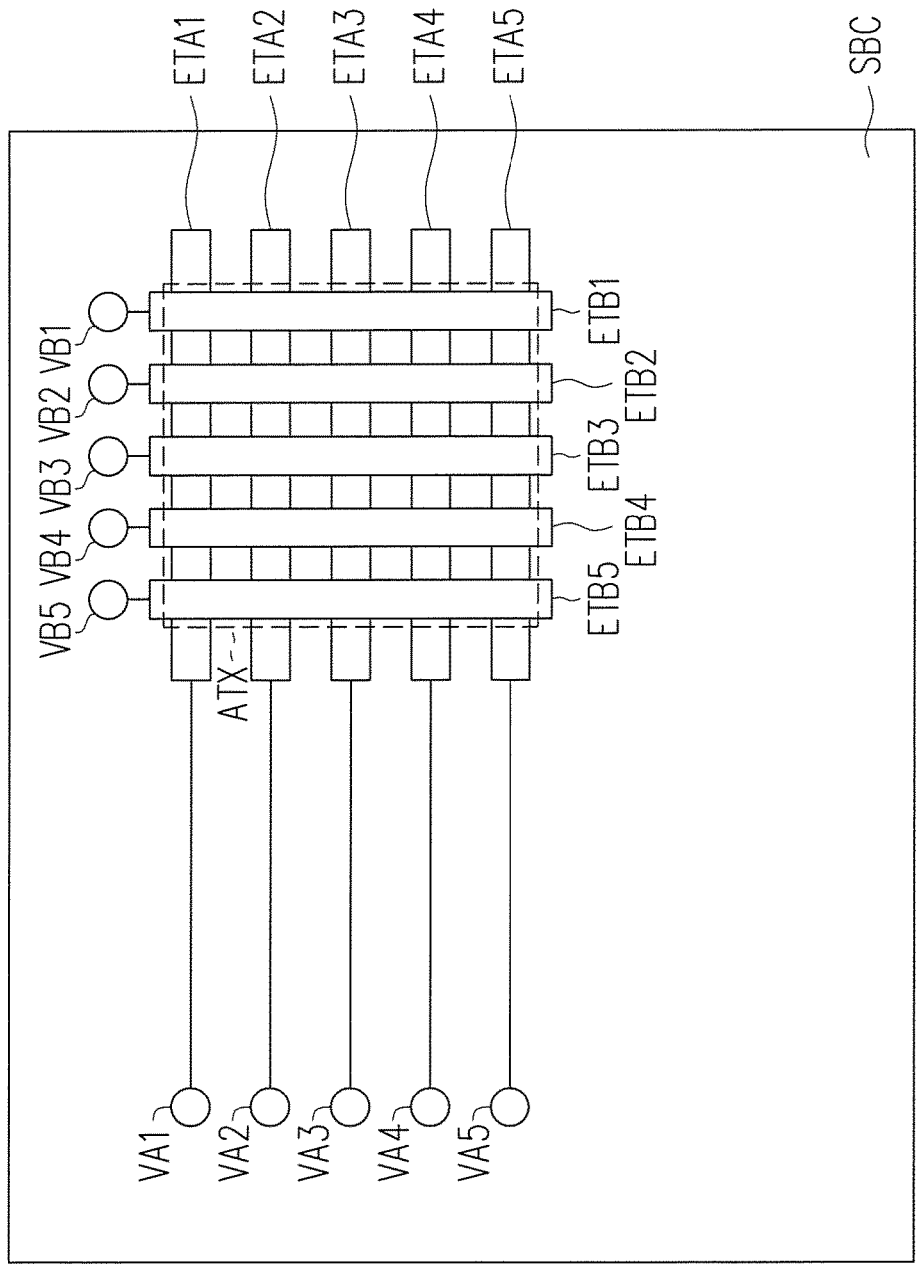

FIGS. 1A and 1B are schematic views illustrating a structure of a touch display apparatus according to an embodiment of the invention. Please refer to FIGS. 1A and 1B. In the embodiment, a touch display apparatus consists of a display apparatus and a touch apparatus, wherein the touch apparatus at least includes a first touch driving circuit 110, a touch detecting circuit 120, a plurality of first touch electrodes (e.g. ETA1~ETA5) and a plurality of second touch electrodes (e.g. ETB1~ETB5). The display apparatus at least includes an active array substrate SBA, a pixel array 130, a display driving circuit 140 and a color filter substrate SBC.

The first touch electrodes ETA1~ETA5 and the second touch electrodes ETB1~ETB5 are configured to perpendicularly interlace with one another at the color filter substrate SBC to form a touch area ATX, wherein the touch area ATX overlaps a display area of the display apparatus (i.e. the area where the pixel array 130 is configured at). The touch driving circuit 110 is configured at the active array substrate SBA, coupled to the touch detecting circuit 120, and coupled to the first touch electrodes ETA1~ETA5 through vias VA1~VA5 to provide a touch driving signal SD1 to the first touch electrodes ETA1~ETA5 in sequence.

The touch driving circuit 110 is controlled by a start signal STV1 provided by the touch detecting circuit 120. After being activated, the touch driving circuit 110 provides the touch driving signal SD1 to the first touch electrodes ETA1~ETA5 in sequence according to a first clock signal CK1 and a second clock signal XCK1 provided by the touch detecting circuit 120, wherein the first clock signal CK1 and the second clock signal XCK1 are inversion signals of each other. Meanwhile, the amplitude and frequency of the touch driving signal SD1 are, for example, proportional to the amplitude and frequency of the first clock signal CK1 and the second clock signal XCK1.

The touch detecting circuit 120 is coupled to the second touch electrodes ETB1~ETB5 through vias VB1~VB5 and coupled to the touch driving circuit 110 to provide the start signal STV1, the first clock signal CK1 and the second clock signal XCK1. In addition, the touch driving circuit 110 is coupled to the display driving circuit 140 to receive the touch capability regulating signal STD, and sets the amplitude and frequency of the first clock signal CK1 and the second clock signal XCK1 according to the touch capability regulating signal STD, that is, to set the noise eliminating capability (which is also called signal-to-noise ratio SNR) of the touch apparatus.

During a touch detecting period, the touch detecting circuit 120 provides the touch driving signal SD1 to the first touch electrodes ETA1~ETA5 in sequence via the touch driving circuit 110, and receives a plurality of detecting signals (e.g. SDT11~SDT15) from the second touch electrodes ETB1~ETB5; that is, the touch detecting circuit 120 drives the first touch electrodes ETA1~ETA5 and the second touch electrodes ETB1~ETB5 in a mutual-capacitance driving manner. In addition, the touch detecting circuit 120 determines whether the touch apparatus senses the touch point according to the providing timing of the touch driving signal SD1 and detecting signals SDT11~SDT15.

The color filter substrate SBC and the active array substrate SBA are assembled together. The pixel array 130 is configured at the active array substrate SBA to form a display area. The display driving circuit 140 is configured at the active array substrate SBA to receive an image signal Simage, and coupled to the pixel array 130 to drive the pixel array 130 according to the image signal Simage. Moreover, the display driving circuit 140 is coupled to the touch detecting circuit 120 to provide the touch capability regulating signal STD to the touch detecting circuit 120, wherein a frame scanning period of the pixel array 130 may overlap a touch detecting period of the touch apparatus.

In the embodiment, the display driving circuit 140 sets the touch capability regulating signal STD according to the image frame transmitted by the image signal Simage; for example, the display driving circuit 140 may set the touch capability regulating signal STD according to image data DD in at least one column of the image frame or image data DD in a display block of the image frame, which should not be construed as a limitation to the invention.

Furthermore, the display driving circuit 140 provides corresponding pixel voltage VP according to display data DD corresponding to each pixel P of the pixel array 130, and the pixel P of the pixel array 130 is turned on row by row; therefore, the pixel voltage VP provided by the display driving circuit 140 may generate oscillation, interfering the touch apparatus to sense the touch point. In order to prevent the touch sensing capability of the touch apparatus from being influenced by the oscillation of the pixel voltage VP, in the embodiment, the display driving circuit 140 may determine whether the image frame transmitted by the image signal Simage will cause the pixel voltage VP to oscillate, thereby adjusting the touch sensing capability of the touch apparatus.

In other words, when the image frame transmitted by the image signal Simage does not cause the pixel voltage VP to oscillate or causes less oscillation of the pixel voltage VP, the display driving circuit 140 may not adjust the touch sensing capability of the touch apparatus; that is, the touch apparatus senses the touch point with original touch sensing capability. When the image frame transmitted by the image signal Simage causes greater oscillation of the pixel voltage VP, the display driving circuit 140 may increase the touch sensing capability of the touch apparatus to prevent the touch apparatus from making a wrong detection of the touch point. Here, the display driving circuit 140 may determine the interference caused by the image frame to the touch sensing capability according to frame comparisons or data computing, which should not be construed as a limitation to the invention.

For example, when the occurrence of a voltage edge in a plurality of pixel voltages VP corresponding to a plurality of image data DD in a column of the image frame is greater than or equal to an interference threshold (e.g. a quarter of the number of the pixel in the column), the touch detecting circuit 120 may increase at least one of an amplitude (e.g. double the amplitude) and a frequency (e.g. increased from 100 Hz to 160 Hz) of the first clock signal CK1 and the second clock signal XCK1. When the occurrence of the voltage edge in the pixel voltage VP corresponding to the image data DD in the column of the image frame is less than the interference threshold, the touch detecting circuit 120 may recover the amplitude and frequency of the first clock signal CK1 and the second clock signal XCK1, i.e. to set the amplitude and frequency of the first clock signal CK1 and the second clock signal XCK1 to be the predetermined amplitude and frequency.

In an embodiment of the invention, the voltage edge is a voltage difference which is between each pixel voltage VP and the timingly adjacent pixel voltage VP and greater than or equal to a voltage oscillation threshold. The voltage oscillation threshold is, for example, a quarter of the highest Gamma voltage and the lowest Gamma voltage.

In an embodiment of the invention, the touch driving circuit 110 has a plurality of shifter registers (e.g. SA1~SA5), wherein the shifter registers SA1~SA5 are sequentially activated by the triggering of the start signal STV1, and the activated shifter register (e.g. SA1~SA5) provides the touch driving signal SD1 according to the clock signals CK1 and XCK1.

Furthermore, the display driving circuit 140 includes a timing controller 141, a gate driver 143 and a source driver 145, wherein the gate driver 143 is controlled by the timing controller 141 to drive the pixel P in the pixel array 130 row by row. The source driver 145 is controlled by the timing controller 141 to provide the pixel voltage VP to the driven pixel P. The timing controller 141 is coupled to the gate driver 143, the source driver 145 and the touch detecting circuit 120 and receives the image signal Simage. The timing controller 141 controls the gate driver 143 according to the image signal Simage, provides image data DD to the source driver 145 according to the image signal Simage, and provides the touch capability regulating signal STD according to image data DD of an image frame. Meanwhile, the gate driver 143 may be formed of a plurality of shifter registers, which should not be construed as a limitation to the invention.

Based on the above, since the circuit or element which is more structurally complicated is directly formed at the active array substrate SBA while those that are less structurally complicated are formed at the color filter substrate SBC, the manufacturing complicity of forming the touch apparatus may be reduced, thereby lowering the manufacturing cost of the touch display apparatus.

Figure 2:
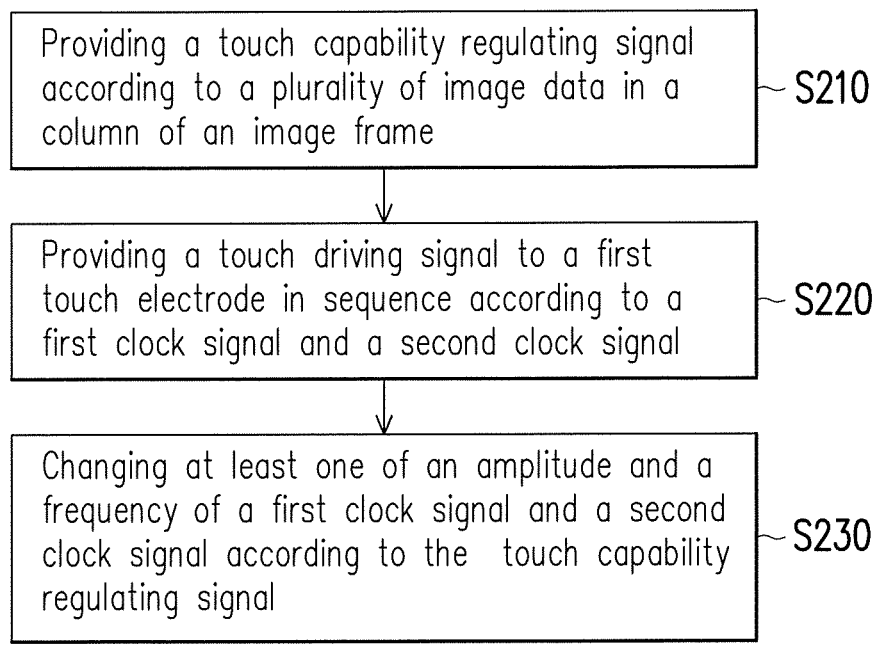
FIG. 2 is a flowchart illustrating an operation method of a touch apparatus according to an embodiment of the invention.

FIG. 2 is a flowchart illustrating an operation method of a touch apparatus according to an embodiment of the invention. Please refer to FIG. 2. In the embodiment, the operation method of the touch apparatus includes the following steps, namely, providing a touch capability regulating signal according to a plurality of image data in a column of an image frame (step S210); providing a touch driving signal to a first touch electrode in sequence according to a first clock signal and a second clock signal (step S220); changing at least one of an amplitude and a frequency of the first clock signal and the second clock signal according to the touch capability regulating signal (step S230), wherein the sequences S210, S220 and S230 are mentioned in an exemplifying sense only, which should not be construed as a limitation to the invention. Also, the details concerning the steps S210, S220 and S230 are provided above in the descriptions concerning FIGS. 1A and 1B; therefore, no further descriptions are incorporated herein.

In summary, in the embodiments of the invention, the touch display apparatus and an operation method of a touch apparatus thereof determine whether the image frame transmitted by the image signal will cause oscillation of the pixel voltage, thereby adjusting the touch sensing capability of the touch apparatus so as to preventing the touch apparatus from making a wrong detection of the touch point.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:
1. A touch display apparatus, comprising:
 a display apparatus, comprising:
  a pixel array forming a display area; and
  a display driving circuit receiving an image signal and coupled to the pixel array to drive the pixel array according to the image signal, and providing a touch capability regulating signal according to a plurality of image data in a column of an image frame, wherein the display driving circuit counts a voltage edge in a plurality of pixel voltages corresponding to the image data in the column of the image frame and compares a counting result of the voltage edge with an interference threshold to provide the touch capability regulating signal; and
 a touch apparatus, comprising:
  a plurality of first touch electrodes and a plurality of second touch electrodes configured to interlace with one another to form a touch area, wherein the touch area overlaps the display area;
  a touch driving circuit coupled to the first touch electrodes to provide a touch driving signal to the first touch electrodes in sequence according to a first clock signal and a second clock signal; and
  a touch detecting circuit coupled to the second touch electrodes to receive a touch detecting signal, coupled to the touch driving circuit to provide the first clock signal and the second clock signal, and coupled to the display driving circuit to change at least one of an amplitude and a frequency of the first clock signal and the second clock signal according to the touch capability regulating signal.

2. The touch display apparatus according to claim 1, wherein, when an occurrence of the voltage edge in the plurality of pixel voltages corresponding to the image data in the column is greater than or equal to the interference threshold, the touch detecting circuit increases at least one of the amplitude and the frequency of the first clock signal and the second clock signal, when the occurrence of the voltage edge in the pixel voltages is less than the interference threshold, the touch detecting circuit recovers the amplitude and the frequency of the first clock signal and the second clock signal.

3. The touch display apparatus according to claim 2, wherein the voltage edge is a voltage difference which is between each of the pixel voltages and the adjacent pixel voltage and greater than or equal to a voltage oscillation threshold.

4. The touch display apparatus according to claim 1, wherein the first touch electrodes and the second touch electrodes perpendicularly interlace with one another.

5. The touch display apparatus according to claim 1, wherein the touch driving circuit provides the touch driving signal to the first touch electrode in sequence during a touch detecting period, and the touch detecting period overlaps a frame scanning period of the pixel array.

6. The touch display apparatus according to claim 1, wherein the first clock signal and the second clock signal are inversion signals of each other.

7. The touch display apparatus according to claim 1, wherein the display apparatus further comprises:
an active array substrate; and
a color filter substrate assembled together with the active array substrate;
wherein the pixel array, the display driving circuit and the touch driving circuit are configured at the active array substrate, the first touch electrodes and the second touch electrodes are configured at the color filter substrate.

8. The touch display apparatus according to claim 7, wherein the display driving circuit comprises:
a gate driver coupled to the pixel array to drive a plurality of pixels in the pixel array row by row;
a source driver coupled to the pixel array to provide a plurality of pixel voltages to the pixels in sequence according to the image data; and
a timing controller coupled to the gate driver, the source driver and the touch detecting circuit, receiving the image signal to provide the image data, wherein the timing controller controls the gate driver according to the image signal, the timing controller provides the image data to the source driver according to the image signal, and provides the touch capability regulating signal according to the image data.

9. The touch display apparatus according to claim 8, wherein the gate driver and the touch driving circuit respectively comprise a plurality of shifter registers.

10. An operation method of a touch apparatus, comprising:
providing a touch capability regulating signal according to a plurality of age data in a column of an image frame;
providing a touch driving signal to a plurality of first touch electrodes in sequence according to a first clock signal and a second clock signal; and
changing at least one of an amplitude and a frequency of the first clock signal and the second clock signal according to the touch capability regulating signal,
wherein the step of providing the touch capability regulating signal according to the plurality of image data in the column of the image frame comprises:
counting a voltage edge in a plurality of pixel voltages corresponding to the image data in the column of the image frame; and
comparing a counting result of the voltage edge with an interference threshold to provide the touch capability regulating signal.

11. The operation method of the touch apparatus according to claim 10, wherein the step of changing at least one of the amplitude and the frequency of the first clock signal and the second clock signal according to the touch capability regulating signal comprises:
when an occurrence of the voltage edge in the plurality of pixel voltages corresponding to the image data of the column is greater than or equal to the interference threshold, increasing at least one of the amplitude and the frequency of the first clock signal and the second clock signal; and
when the occurrence of the voltage edge in the plurality of pixel voltages is less than the interference threshold, recovering the amplitude and the frequency of the first clock signal and the second clock signal.

12. The operation method of the touch apparatus according to claim 11, wherein the voltage edge is a voltage difference which is between each of the pixel voltages and the adjacent pixel voltage and greater than or equal to a voltage oscillation threshold.

* * * * *